(12) United States Patent
Unuma et al.

(10) Patent No.: US 10,430,733 B2
(45) Date of Patent: Oct. 1, 2019

(54) ANALYSIS METHOD FOR TIME SERIES DATA AND DEVICE THEREFOR

(71) Applicant: Hitachi, Ltd., Chiyoda-ku, Tokyo (JP)

(72) Inventors: Munetoshi Unuma, Tokyo (JP); Hideaki Suzuki, Tokyo (JP); Tomoaki Hiruta, Tokyo (JP); Junsuke Fujiwara, Tokyo (JP); Takayuki Uchida, Tokyo (JP); Shinya Yuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 400 days.

(21) Appl. No.: 14/915,351

(22) PCT Filed: Sep. 11, 2013

(86) PCT No.: PCT/JP2013/074453
§ 371 (c)(1),
(2) Date: Feb. 29, 2016

(87) PCT Pub. No.: WO2015/037064
PCT Pub. Date: Mar. 19, 2015

(65) Prior Publication Data
US 2016/0217398 A1 Jul. 28, 2016

(51) Int. Cl.
*G06Q 10/06* (2012.01)
*G06Q 50/30* (2012.01)

(52) U.S. Cl.
CPC .......... *G06Q 10/06* (2013.01); *G06Q 50/30* (2013.01)

(58) Field of Classification Search
CPC ............................... G06N 5/02; G06Q 10/06
See application file for complete search history.

(56) References Cited

U.S. PATENT DOCUMENTS 7,079,927 B1 * 7/2006 Tano .................. G01C 21/26
701/25
2008/0071501 A1 3/2008 Herzog
(Continued)

FOREIGN PATENT DOCUMENTS

JP 2005-284829 A 10/2005
JP 2006-185226 A 7/2006
(Continued)

OTHER PUBLICATIONS

International Search Report (PCT/ISA/210) issued in PCT Application No. PCT/JP2013/074453 dated Oct. 8, 2013 with English-language translation (four (4) pages).

*Primary Examiner* — Marc Anthony Armand
(74) *Attorney, Agent, or Firm* — Crowell & Moring LLP (57) ABSTRACT

An analysis device for time series data from an apparatus to be diagnosed is provided with an accumulation device which accumulates sensor data, operation data, or control data, obtained from the apparatus, while accumulating time information, an algorithm accumulation unit which accumulates algorithms for recognizing behavior of the apparatus, a behavior recognition unit which recognizes behavior of the apparatus by using a recognition algorithm, and a specification unit which specifies a behavioral item to be recognized. A behavior recognition algorithm corresponding to the specified behavioral item is selected from the algorithm accumulation unit; sensor data, operation data, or control data is selected from the accumulation device; start and end times of a selected behavior are recognized by the behavior recognition unit; and the recognized start and end times are associated with time information about data accumulated in the accumulation device.

8 Claims, 9 Drawing Sheets

(56) References Cited

U.S. PATENT DOCUMENTS

| | | |
|---|---|---|
| 2010/0178637 A1 | 7/2010 | Lecointre et al. |
| 2010/0235140 A1 | 9/2010 | Satonaga et al. |
| 2012/0317066 A1* | 12/2012 | Miyazaki ............... G06Q 50/10 |
| | | 706/46 |
| 2016/0109883 A1* | 4/2016 | Sim ....................... G01S 5/0263 |
| | | 701/23 |

FOREIGN PATENT DOCUMENTS

| | | |
|---|---|---|
| JP | 2010-504501 A | 2/2010 |
| JP | 2010-216912 A | 9/2010 |
| JP | 2010-533320 A | 10/2010 |
| JP | 2012-197181 A | 10/2012 |
| JP | 2013-171319 A | 9/2013 |

* cited by examiner

| TIME | HOIST CYLINDER PRESSURE | CARRYING WEIGHT | HOIST LEVER OPERATION | MOVING SPEED | BEHAVIOR RECOGNITION RESULT |
|---|---|---|---|---|---|
| 12:25:23 | 126 | 320 | 01 | 52 | |
| 12:25:24 | 124 | 322 | 01 | 54 | |
| 12:25:25 | 125 | 324 | 01 | 53 | START OF UNLOADING |
| 12:25:26 | 126 | 323 | 1F | 54 | |
| 12:28:02 | 12 | 12 | AB | 0 | |
| 12:28:03 | 14 | 16 | AB | 0 | END OF UNLOADING |
| 12:28:04 | 16 | 15 | AB | 0 | |
| 12:28:05 | 15 | 14 | 01 | 0 | |

ANALYSIS METHOD FOR TIME SERIES DATA AND DEVICE THEREFOR

TECHNICAL FIELD

The present invention relates to an analysis method for time series data and a device therefor.

BACKGROUND ART

[PTL 1] and [PTL 2] are background arts in this technical field.

[PTL 1] discloses a system that extracts a time series waveform at regular time intervals, i.e., for example, daily or weekly and expresses a chronological change.

[PTL 2] discloses that an ascendant state and a descendent state are recognized by using a value of an acceleration sensor and abnormality is diagnosed by using abnormality determination parameters corresponding to the respective states.

CITATION LIST

Patent Literatures

PTL 1: JP-A-2006-185226
PTL 2: JP-A-2012-197181

SUMMARY OF INVENTION

Technical Problem(s)

[PTL 1] is effective in the case where a waveform is extracted at certain time period intervals determined in advance, i.e., for example, daily or weekly. However, for example, [PTL 1] cannot meet a request to see a change in the number of revolutions in an engine in a time section in which a dump truck performs unloading work.

In [PTL 2], a diagnosis waveform is extracted by threshold processing with the use of a sensor value for use in recognition of a state passing in real time. Therefore, [PTL 2] cannot be applied to usage for diagnosing abnormality in a state that cannot be found at the time of observation (for example, a state in which, when it is desired to diagnose abnormality of an elevator moving from 1F to 4F, 4F is a destination floor when the elevator starts but 3F is pressed as a stop floor by a passenger who gets on the elevator on a middle floor). Further, [PTL 2] is an invention devised for diagnosis and does not mention display of a waveform.

Solution to Problem(s)

In order to achieve the above problem, the invention provides an analysis device for time series data of an apparatus to be diagnosed, including: an accumulation device for accumulating sensor data, operation data, or control data obtained from the apparatus to be diagnosed together with time information; an algorithm accumulation unit for accumulating an algorithm for recognizing a behavior of the apparatus to be diagnosed; a behavior recognition unit for recognizing the behavior of the apparatus to be diagnosed by using the recognition algorithm; and a specification unit for specifying a behavioral item to be recognized, in which, in accordance with the specified behavior recognition item, a behavior recognition algorithm corresponding to the behavior recognition item is selected from the algorithm accumulation unit, sensor data, operation data, or control data for use in the behavior recognition algorithm is selected from the accumulation device, start and end times of a selected behavior are recognized by the behavior recognition unit, and the start and end times are associated with time information of data accumulated in the accumulation device for accumulating sensor data, operation data, or control data obtained from the apparatus to be diagnosed together with time information.

Further, in the analysis device for time series data in the invention, the sensor data, the operation data, or the control data obtained from the apparatus to be diagnosed and content of the recognized behavior are displayed together with the time information.

Further, in the analysis device for time series data in the invention, the sensor data, the operation data, or the control data obtained from the apparatus to be diagnosed and content of the recognized behavior in a section in which a specific behavior is performed are extracted together with the time information and are arranged and displayed in time series on the basis of the start time of the behavior.

Further, in the analysis device for time series data in the invention, the sensor data, the operation data, or the control data and content of the behavior are output.

Further, in the analysis device for time series data in the invention, the sensor data, the operation data, or the control data obtained from the apparatus to be diagnosed, content of the recognized behavior, and the time information in a section in which a specific behavior is performed are extracted and output.

Further, in the analysis device for time series data in the invention, a diagnosis algorithm is changed in each behavior section by using the behavior recognition algorithm corresponding to the behavior recognition item and diagnosis processing is performed.

Further, in order to achieve the above problem, the invention provides an analysis method for time series data of an apparatus to be diagnosed, including: accumulating sensor data, operation data, or control data obtained from the apparatus to be diagnosed together with time information; accumulating an algorithm for recognizing a behavior of the apparatus to be diagnosed; recognizing the behavior of the apparatus to be diagnosed by using the recognition algorithm; and specifying a behavioral item to be recognized, in which, in accordance with the specified behavior recognition item, a behavior recognition algorithm corresponding to the behavior recognition item is selected from the algorithm accumulation unit, sensor data, operation data, or control data for use in the behavior recognition algorithm is selected from the accumulation device, start and end times of a selected behavior are recognized by the behavior recognition unit, and the start and end times are associated with time information of data in which the sensor data, the operation data, or the control data obtained from the apparatus to be diagnosed is accumulated together with the time information.

Further, in the analysis method for time series data in the invention, the sensor data, the operation data, or the control data obtained from the apparatus to be diagnosed and content of the recognized behavior are displayed together with the time information.

Further, in the analysis method for time series data in the invention, the sensor data, the operation data, or the control data obtained from the apparatus to be diagnosed and content of the recognized behavior in a section in which a specific behavior is performed are extracted together with the time information and are arranged and displayed in time series on the basis of the start time of the behavior.

Further, in the analysis method for time series data in the invention, the sensor data, the operation data, or the control data and content of the behavior are output.

Further, in the analysis method for time series data in the invention, the sensor data, the operation data, or the control data obtained from the apparatus to be diagnosed, content of the recognized behavior, and the time information in a section in which a specific behavior is performed are extracted and output.

Further, in the analysis method for time series data in the invention, a diagnosis algorithm is changed in each behavior section by using the behavior recognition algorithm corresponding to the behavior recognition item and diagnosis processing is performed.

Advantageous Effects of Invention

According to the invention, it is possible to observe how sensor data, control data, or operation data in each behavior is changed.

According to the invention, it is possible to selectively observe data of a part where a behavior to be diagnosed is performed among remarkably long time series data.

According to the invention, by using output results of the data, it is possible to diagnose and analyze data in a section in which a specific behavior is performed in post-processing.

According to the invention, it is possible to perform diagnosis processing by using a diagnosis algorithm specialized in each behavior. This makes it possible to improve recognition accuracy and reduce false alarms.

DESCRIPTION OF EMBODIMENTS

Hereinafter, examples of the invention will be described with reference to drawings.

Example 1

Figure 1:
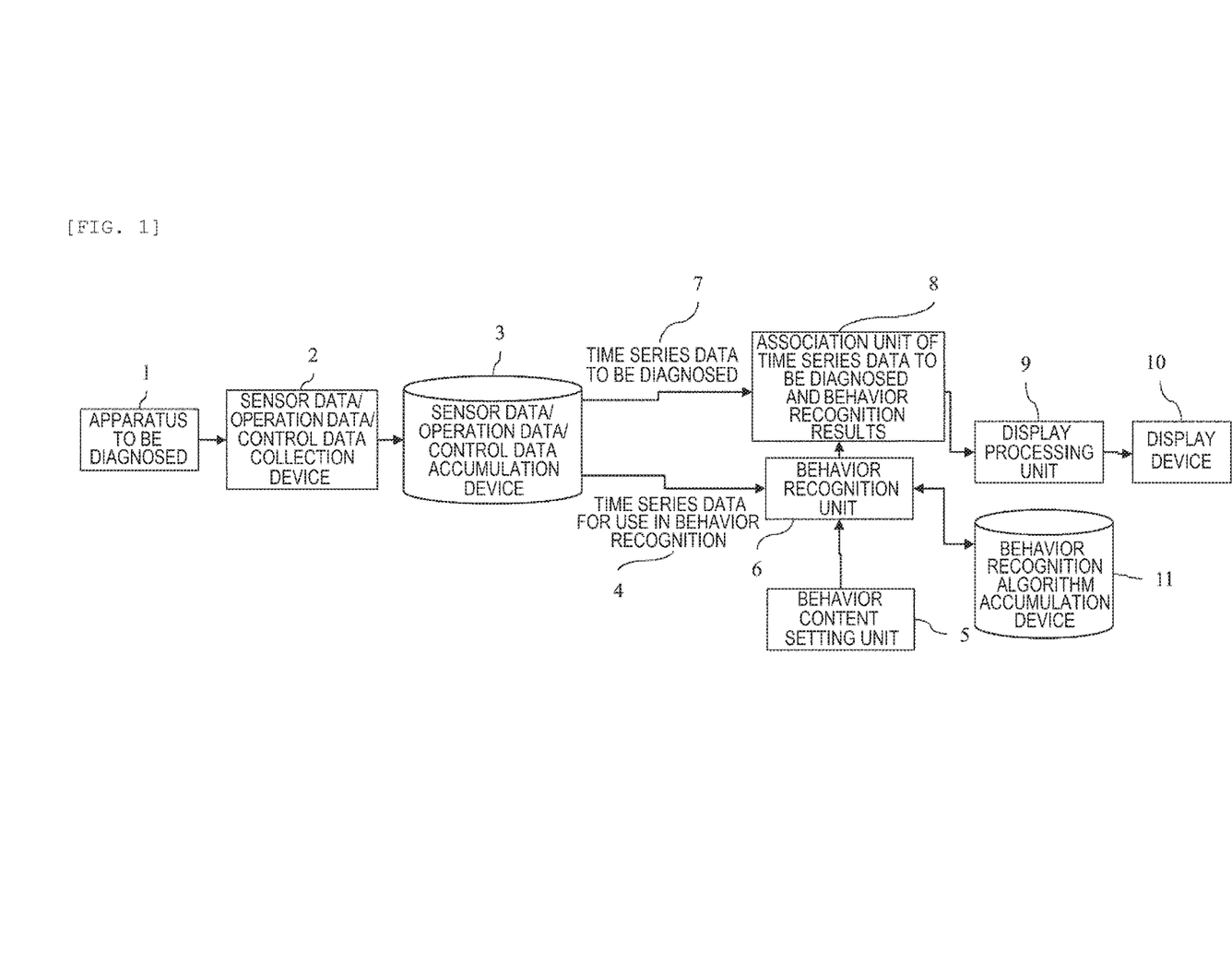
FIG. 1 shows an example of a configuration diagram of the invention.
Figure 2:
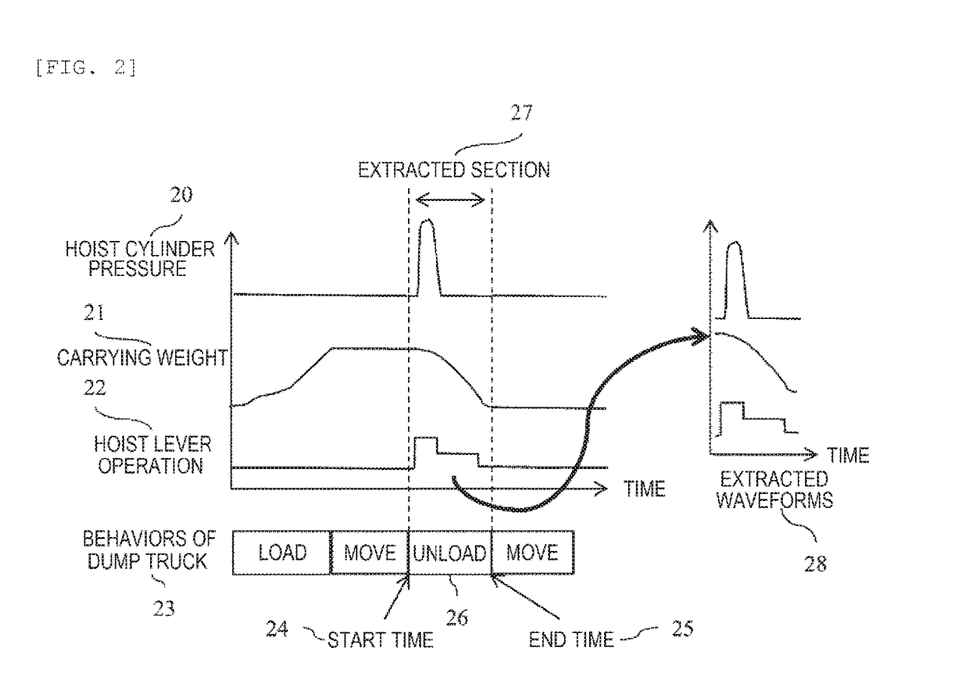
FIG. 2 shows a display example of the invention.

FIG. 1 shows a configuration diagram of the invention. FIG. 2 shows, as an application example, an example where waveforms of various sensors in an unloading section of a dump truck and behaviors of the dump truck are recognized, are associated on the basis of start times and end times of the behaviors, and are displayed.

"Loading" of dirt and gravel onto a dump body (bed for carrying dirt, gravel, and the like) of a dump truck in an excavation site, "moving" of the dump truck to an accumulation location of dirt and gravel, "unloading" in the accumulation location, and "moving" thereof to head for the excavation site again are repeatedly performed. Herein, for example, "loading", "moving", and "unloading" states are defined as behaviors 23 of the dump truck in the following description.

Figure 3:
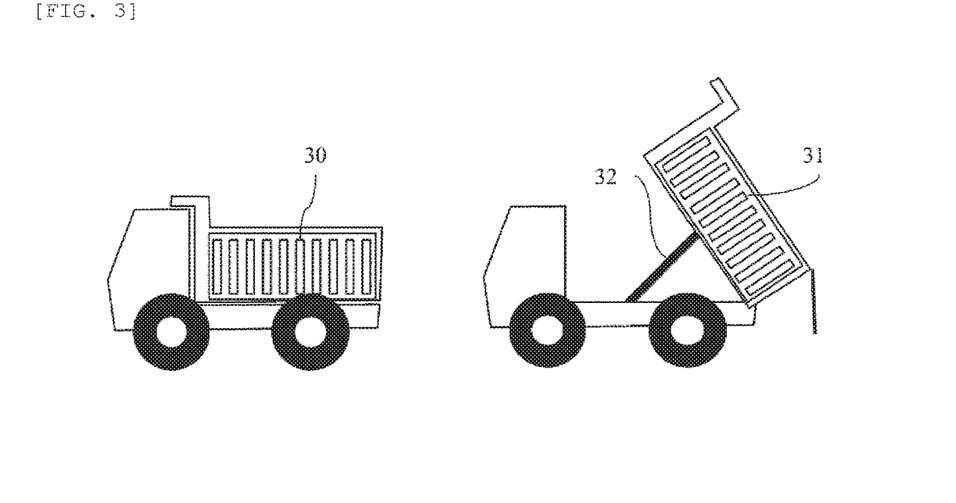
FIG. 3 shows a structure of a dump truck.

A hoist cylinder pressure 20, a carrying weight 21, and a hoist lever position 22 are examples of signal waveforms of a sensor and a control signal related to a case where carried dirt and gravel are unloaded (soil is disposed of) from the dump truck. As shown in FIG. 3, a dump body 30 for carrying dirt, gravel, and the like is attached to the dump truck. A hoist cylinder 32 which is extended and is contracted by using an oil pressure is attached to the dump body, and an operator can dispose of carried dirt and gravel by operating a hoist operation lever and extending the to cylinder 32 to incline a dump body 31.

A configuration of the invention will be described with reference to FIG. 1. A sensor value of an apparatus 1 to be diagnosed, an operation signal from an operator, and control data of the apparatus are collected in a sensor data/operation data/control data collection device 2. The apparatus 1 to be diagnosed is a dump truck in this example.

Figure 4:
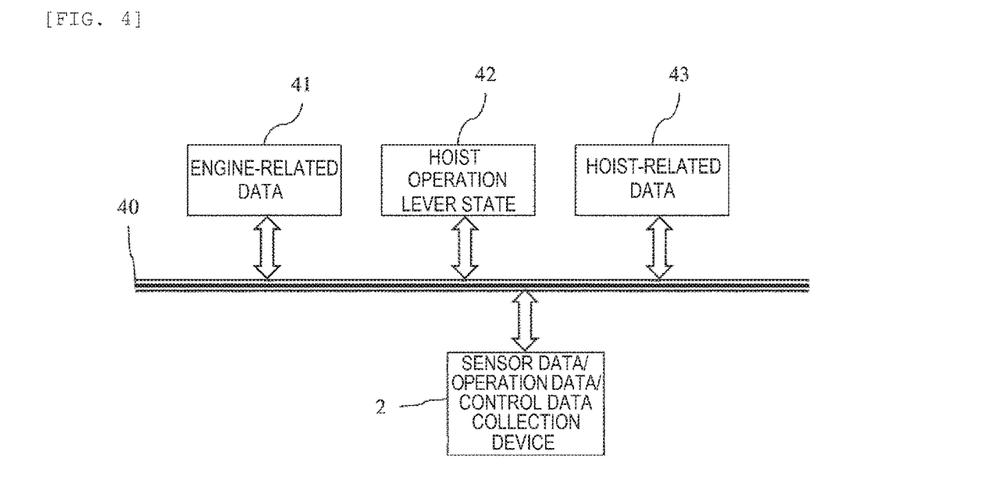
FIG. 4 shows a method of obtaining data of a sensor and a control signal in a dump truck.

In the case of a dump truck, the sensor data/operation data/control data collection device 2 collects data by using a method of obtaining data of a sensor and a control signal in a dump truck in FIG. 4. A CAN (Controller Area Network) 40 which is a standard used for transferring data between devices and is used for vehicles and the like is provided, and engine-related data 41 such as the number of revolutions and a temperature of an engine, a hoist operation lever state 42 performed by an operator, hoist-related data 43 such as a hoist cylinder pressure and an angle value of a dump body moved by hoist operation, and, although not shown, other various kinds of sensor information such as a driving speed and a moving distance of a dump truck, control information about a vehicle, and the like are transmitted through the CAN 40. It is possible to collect a sensor value, an operation signal from an operator, and control data of the apparatus by connecting the sensor data/operation data/control data collection device 2 to the CAN 40 and receiving ng various kinds of information flowing through the CAN.

Figure 5:
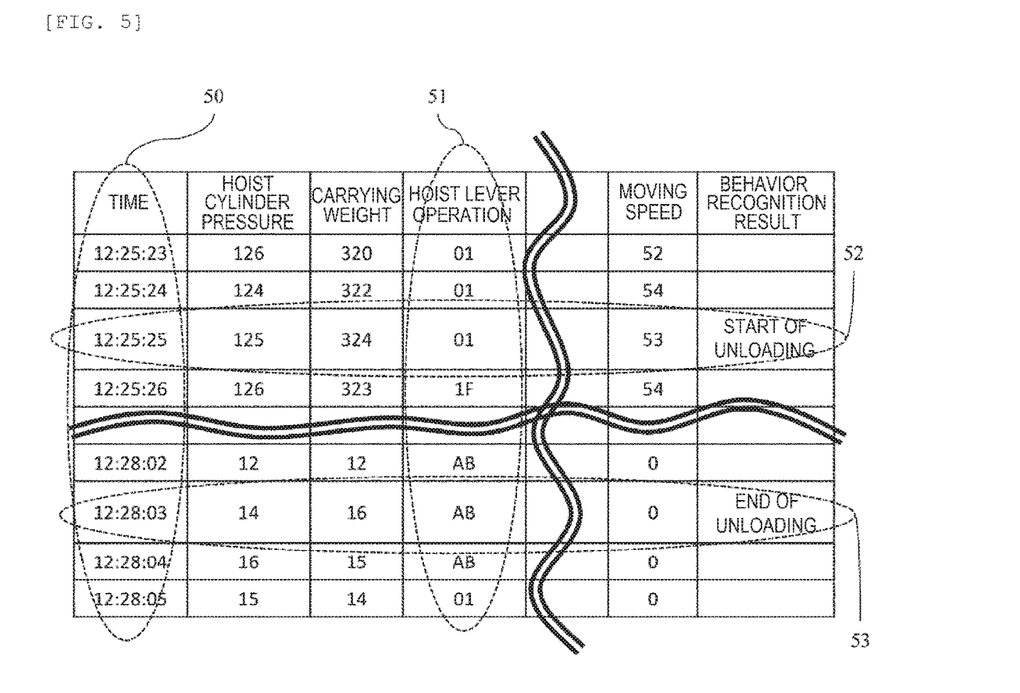
FIG. 5 shows an example of accumulated data.

A configuration of a sensor data/operation data/control data accumulation device 3 will be described. FIG. 5 shows a structure which accumulates data collected by the sensor data/operation data/control data collection device 2 together with timestamps.

A configuration of a behavior content setting unit 5 will be described. In the example of FIG. 2, which behavioral item is recognized, such as "unload", "load", or "move", is specified.

A configuration of a behavior recognition unit 6 will be described. The behavior recognition unit 6 selects a behavior recognition algorithm corresponding to a behavioral item specified in the behavior content setting unit 5 from a behavior recognition algorithm accumulation device 11 and performs processing by using data 4 for use in the behavior recognition algorithm among data accumulated in the sensor data/operation data/control data accumulation device 3.

Figure 6:
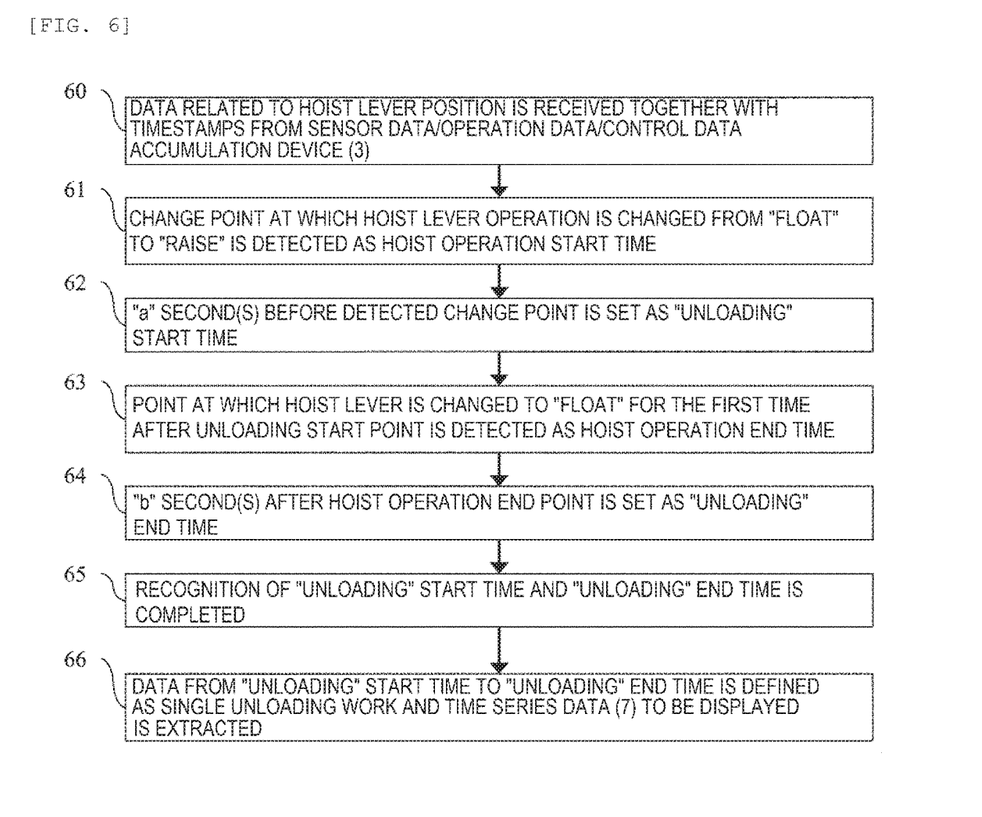
FIG. 6 shows an example of a behavior recognition algorithm.
Figure 7:
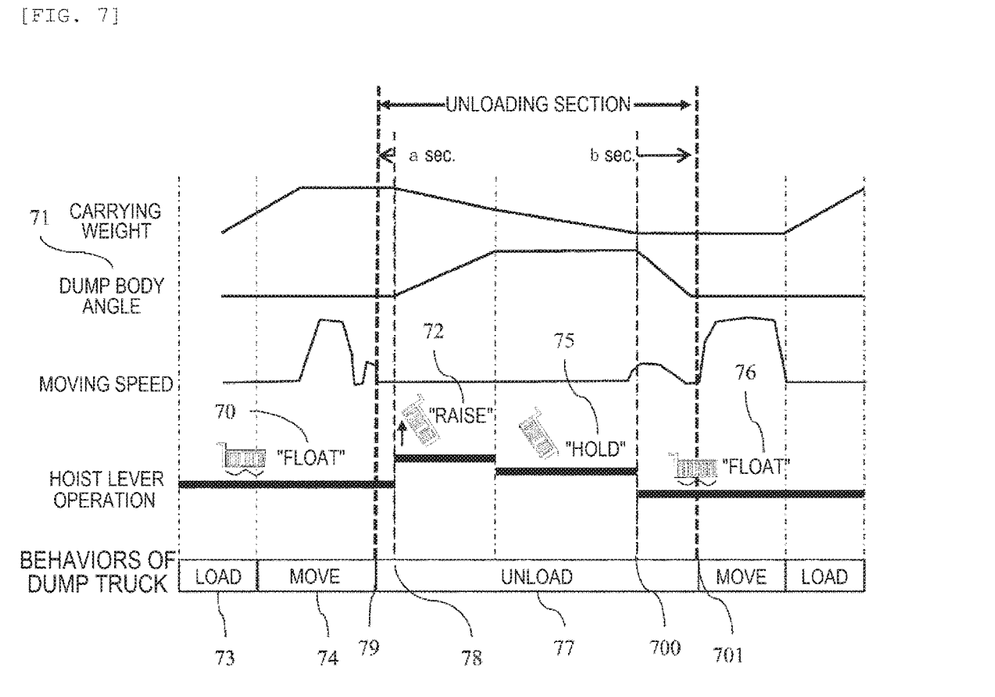
FIG. 7 shows an example of hoist operation.

FIG. 6 shows an example of the behavior recognition algorithm. FIG. 7 shows an example of hoist lever operation in a dump truck.

A method of operating a hoist of a dump truck will be described before the description of processing in FIG. 7. In the case where a hoist lever as an a state or "float" 70, a pressure is not applied to a hoist cylinder, and a dump body is lowered by its own weight and is supported by a vehicle body frame of the dump truck, and therefore the dump body is kept in a horizontal state. Thus, the hoist lever is in the "floating" state during "load" 73 and "move" 74. In the case where the dump truck arrives at an unloading place 77 and the dump body is set to "raise" 72, a pressure in the hoist cylinder is increased to push up the dump body 71. The hoist lever is changed to "hold" 75 at substantially a maximum angle. The hoist cylinder is fixed and the angle of the dump body is kept in the above state. When disposing of conveyed dirt and gravel is completed, the hoist lever is changed to "float" 76. The pressure in the hoist cylinder is reduced, and the dump body is lowered by its own weight toward the vehicle body frame of the dump truck. In the case where the hoist lever is changed to "hold" after lowering, the hoist cylinder supports a weight of the dump body and a weight of a carried object and is therefore broken in some cases. Therefore, moving and loading work are performed in the "floating" state.

FIG. 6 shows an example of a behavior recognition algorithm devised on the basis of procedures of hoist operation. Processing is performed in the following order.

(a) Data related to hoist lever operation is received together with timestamps from the sensor data/operation data/control data accumulation device 3. The timestamps and the data correspond to data in a column of time 50 and a column of hoist lever operation 51 in FIG. 5.

(b) A change point at which a hoist lever position is changed from "float" to "raise" is detected as a hoist operation start time 78 61.

(c) The hoist operation start time may be set as an "unloading" start time. However, in the case where it is desired to know a moving speed of the dump truck and a carrying weight thereof before the hoist lever is set to "raise", "a" second (s) before the hoist operation lever is changed from "float" to "raise" may be set as an "unloading" start time 79 62. Such a going-back time period "a" is set in an input unit such as the behavior content setting unit 5.

(d) A point at which the hoist lever is changed to "float." for the first time after the unloading start point is detected as a hoist operation end time 700 63.

(e) The dump body is still lifted at the hoist operation end time. Therefore, a time period until the dump body is lowered by its own weight to be brought into contact with the vehicle body frame is assumed to be "b" second(s), and "b" second(s) after the hoist operation end point is set as an "unloading" end time 701 64. Although the behavior is recognized by using only position information about the hoist operation lever in the processing of FIG. 6, a dump body angle 71 is also usable. In other words, when the hoist lever position is in the "floating" state and the dump body angle is reduced to an angle at which the dump body is brought into contact with the vehicle body frame, a time at the above angle may be set as the "unloading" end time.

By performing the processing in the above order, recognition of the "unloading" start time and the "unloading" end time is completed.

Time series data to be displayed and a behavior recognition result are associated in an association unit 8 of time series data to be diagnosed and behavior recognition results.

In the example of FIG. 5, for example, in the case where 12:25:25 is recognized as the unloading start time, the association unit may add information 52 indicating start of unloading to a behavior recognition result column, and, in the case where 12:28:03 is recognized as the unloading end time, the association unit may add information 53 indicating end of the unloading to the behavior recognition result column.

The recognition algorithm in the "unloading" section has been described in this example. However, it is also possible to recognize, for example, "loading" or "moving" by selecting a behavior recognition algorithm corresponding to "loading" or "moving" and sensor information, control information, or operation information for use in the algorithm.

A display processing unit 9 is a unit for performing display processing of a behavior recognition result and time series data to be diagnosed, and a result of the processing is displayed on a display device 10. FIG. 2 shows an example of such display. The display processing unit 9 performs drawing processing so that, when a horizontal axis indicates time sensor information and operation information collected from a dump truck which is an apparatus to be diagnosed, such as the hoist cylinder pressure 20, the carrying weight 21, and the hoist lever position 22, are arranged and displayed in the same time axis and a result of recognition in the behavior recognition unit 6 is also arranged and displayed in the same time axis. By displaying a result of this processing on the display device 10, it is possible to observe how sensor data, control data, and operation data in each behavior are changed.

It is also possible to extract and display only the "unloading" section as shown in a display example 28 of FIG. 2. As an extraction method, data in rows from the unloading start time 52 to the unloading end time 53 corresponding thereto in FIG. 5 may be extracted and displayed as shown in the display example 28 of FIG. 2. Such extraction display is effective in the case where it is desired to selectively observe data of a part where a behavior to be diagnosed is performed among remarkably long time series data.

Figure 8:
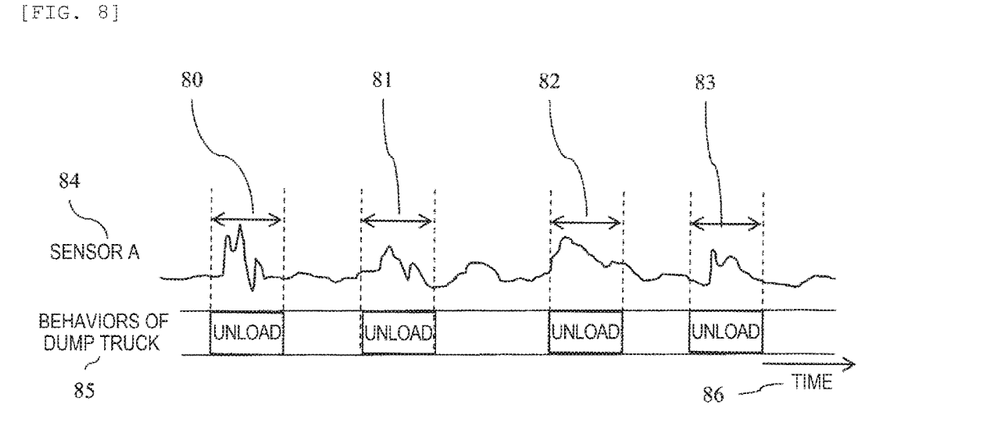
FIG. 8 shows an example where a behavioral item and sensor data are arranged and displayed.

FIG. 8 shows an example where a plurality of conveyance cycles are displayed on the same screen. Although one conveyance cycle (load→move→unload→move load) is displayed in the example of FIG. 2, the plurality of conveyance cycles are simultaneously displayed in FIG. 8, and only unloading sections are displayed as a behavioral item of a dump truck. A horizontal axis indicates time, and, in a vertical axis, a sensor value 84 of a certain sensor A in the dump truck and a behavior 85 of the dump truck are arranged and displayed while being synchronized with time. Waveform sections recognized as the unloading sections are displayed as a section 80, a section 81, a section 82, and a section 83. Although only unloading is displayed in this display example, it is also possible to display not only unloading but also other behavioral items as shown in FIG. 2.

Figure 9:
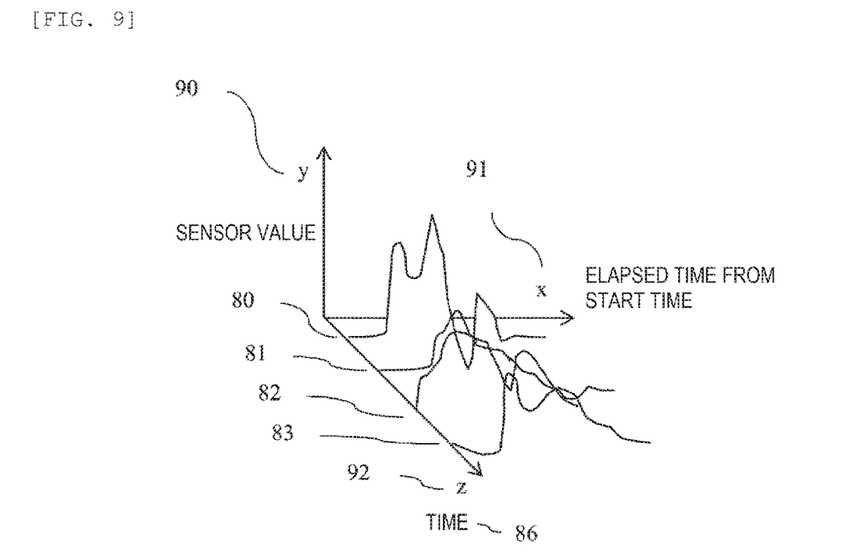
FIG. 9 shows an example where sensor data in a specific behavior section is arranged and displayed.

FIG. 9 shows an example where the waveform sections recognized as the unloading sections in FIG. 8 are extracted and are arranged and displayed in a three-dimensional space. In FIG. 9, an x-axis 91 indicates an elapsed time from a time at which start of unloading is recognized, a y-axis 90 indicates a sensor value, and a z-axis 92 indicates a time at which the sensor value A is measured (corresponding to timestamp 50 in FIG. 5), which is the same as a time 86 in FIG. 8. As shown in FIG. 9, it is possible to visually determine how the sensor value is changed with time in the sections which are all unloading sections.

Figure 10:
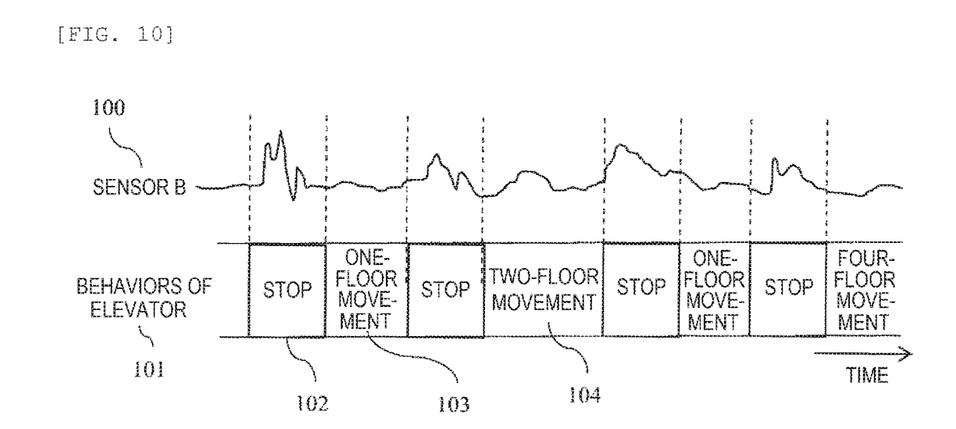
FIG. 10 shows an application example of an elevator.

Note that, although recognition of behaviors of the dump truck has been exemplarily described in this example, this example can also be implemented in other apparatuses to be diagnosed. FIG. 10 shows an example where a diagram showing a change in a sensor B of an elevator based on a behavior of the elevator is displayed together with behavioral items. A stop 102, which is a behavioral item, is a behavior indicating a state in which the elevator stops, and a one-floor movement 103 indicates a state in which the elevator moves from one floor to the next floor (for example, moves from a fifth floor to a sixth floor). Similarly, a two-floor movement 104 indicates that the elevator moves from one floor to another floor located two floors away from the one floor. A stop of the elevator can be detected by, for example, a behavior recognition algorithm lasing the number of revolutions of a winding-up motor as input data. A behavior of a floor movement can be recognized by accumulating, in the sensor data/operation data/control data accumulation device 3, sensor data indicating at which floor the elevator stops and using an algorithm for obtaining a difference between stopped floors. By accumulating the above data as data associated with timestamps shown in FIG. 5, it is possible to perform display shown in FIG. 10.

Figure 11:
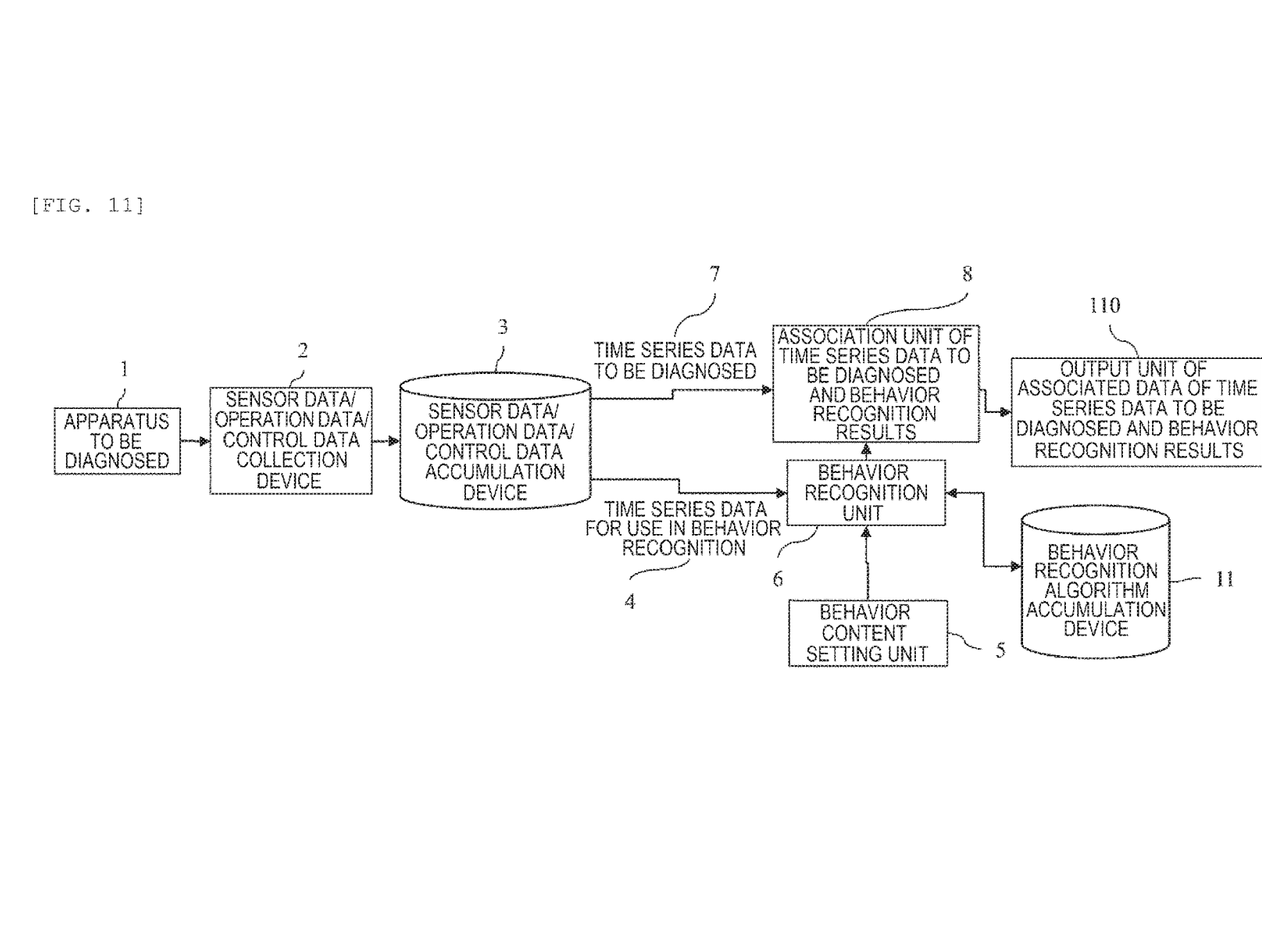
FIG. 11 shows an example of a configuration diagram of a case where associated data is output in the invention.

FIG. 11 shows a configuration for outputting data in which time series data to be diagnosed is associated with a behavior recognition result. Parts denoted by the same reference signs as those of FIG. 1 already described above have similar configurations and similar effects, and therefore description thereof is omitted unless specifically mentioned otherwise.

An output unit 110 of associated data of time series data to be diagnosed and behavior recognition results is provided in the configuration of FIG. 11. The output unit 110 of associated data of time series data to be diagnosed and behavior recognition results outputs, for example, the data in which the time series data to be diagnosed is associated with the behavior recognition results in FIG. 5, the sensor data, the control data, and the operation data in a section in which a specific behavioral item is performed in the display example 28 of FIG. 2, and data corresponding to a specific behavioral item, which is extracted from time series data, such as the section. 80, the section 81, the section. 82, and the section 83 in FIG. 8.

By using output results of the data, it is possible to diagnose and analyze data in a section in which a specific behavior is performed in post-processing.

Example 3

Figure 12:
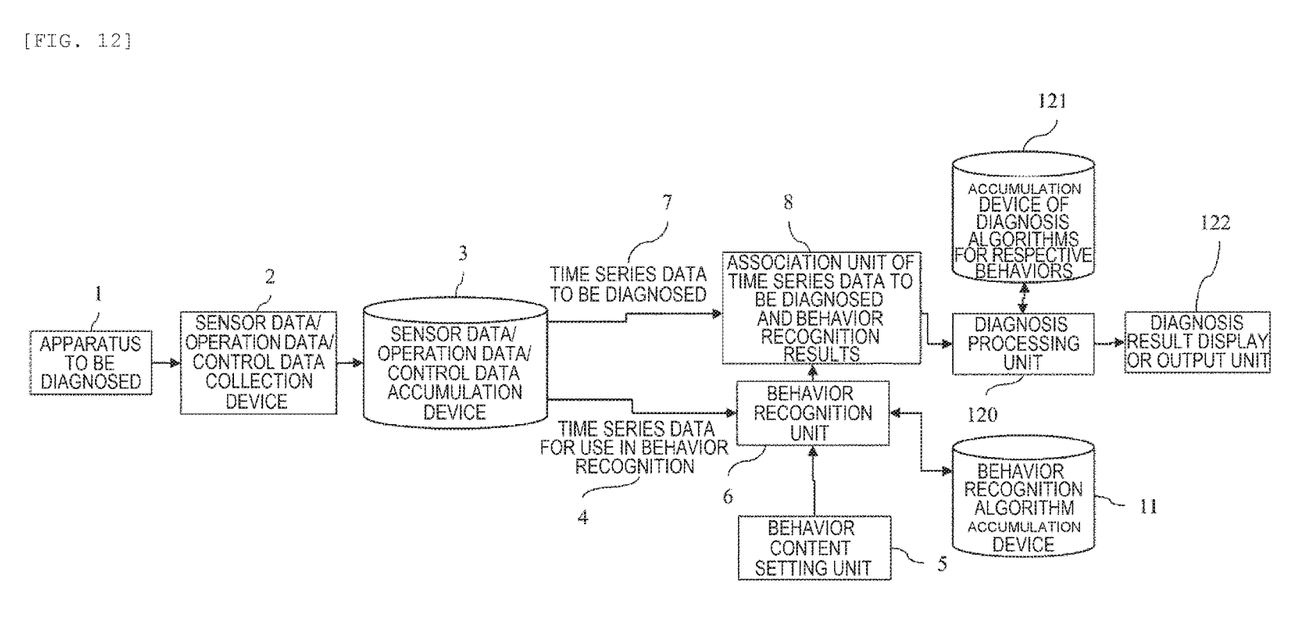
FIG. 12 shows a configuration diagram for changing a diagnosis processing algorithm in accordance with a recognized behavioral item and performing processing.

FIG. 12 is a configuration diagram in which a diagnosis algorithm is changed on the basis of a behavior recognition result and processing is performed. Parts denoted by the same reference signs as those of FIG. 1 already described above have similar configurations and similar effects, and therefore description thereof is omitted unless specifically mentioned otherwise. An accumulation device 121 which accumulates diagnosis algorithms for respective behaviors, a diagnosis processing unit 120, and a diagnosis result display or output unit 122 are provided.

The diagnosis processing unit 120 performs diagnosis processing by using a diagnosis algorithm for each behavior from the accumulation device 121 which accumulates diagnosis algorithms in accordance with a behavioral item associated in the association unit 8 of time series data to be diagnosed and behavior recognition results.

Figure 13:
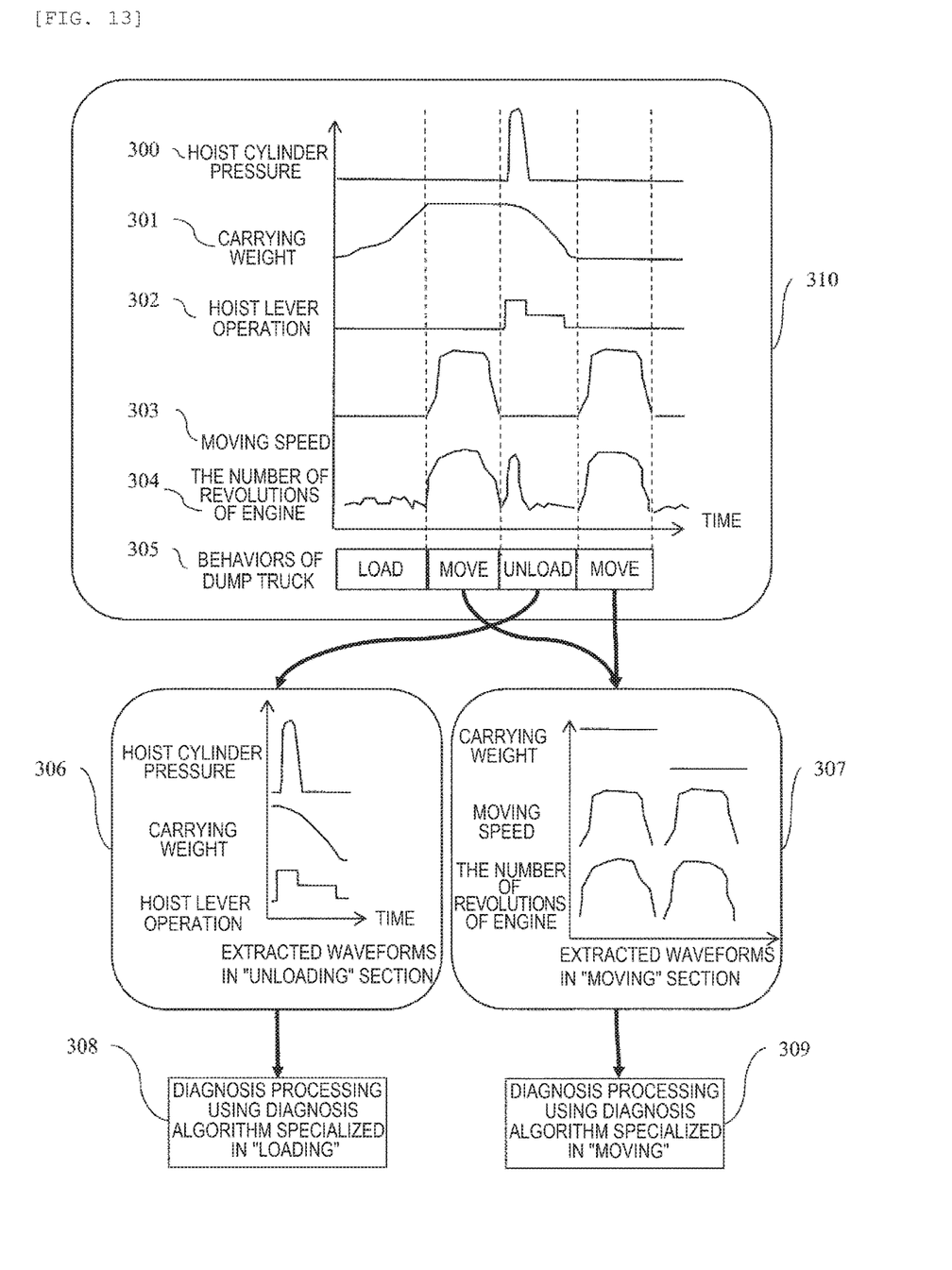
FIG. 13 shows a flow of processing in which a diagnosis processing algorithm is changed and processing is performed.

FIG. 13 shows a flow of the diagnosis processing. A display example 310 is an example of sensor data/operation data/control data in which time series data to be diagnosed is associated with behavior recognition results in the association unit 8 of time series data to be diagnosed and behavior recognition results. Data in the "unloading" section, which is extracted from the above data, is shown in a display example 306. Selected sensor data/operation data/ control data items are a hoist cylinder pressure 300, a carrying weight 301, and hoist lever operation 302. Diagnosis processing 308 which is a diagnosis algorithm specialized in "unloading" is selected from an accumulation device 121 which accumulates diagnosis algorithms, and the apparatus 1 to be diagnosed is subjected to the diagnosis processing. Similarly, data in the "moving" section, which is extracted therefrom, is shown in a display example 307. Selected sensor data/operation data/control data items are the carrying weight 301, a moving speed 303, and number of revolutions 304 of an engine, and diagnosis processing is performed by using the above data, a diagnosis algorithm specialized in "moving", and diagnosis processing 309.

A diagnosis result is displayed or data of the diagnosis result is output via the diagnosis result display or output unit 122.

Although the apparatus to be diagnosed performs various behaviors in this example, it is possible to perform diagnosis processing by using a diagnosis algorithm specialized in each behavior. This makes it possible to improve recognition accuracy and reduce false alarms.

REFERENCE SIGNS LIST 1 apparatus to be diagnosed
2 sensor data/operation data/control data collection device
3 sensor data/operation data/control data accumulation device
5 behavior content setting unit
6 behavior recognition unit
8 association unit of time series data to be diagnosed and behavior recognition results
9 display processing unit
11 behavior recognition algorithm

The invention claimed is:

1. An analysis device for time series data of an apparatus to be diagnosed, comprising:
a plurality of sensors arranged in the apparatus to sense changes in structural components of the apparatus during use of the apparatus;
an accumulation device for accumulating sensor data corresponding to the changes in the structural components of the apparatus, operation data corresponding to the changes in the structural components of the apparatus, and control data corresponding to the changes in the structural components of the apparatus obtained from the apparatus together with time information;
an algorithm accumulation unit for accumulating a plurality of behavior recognition algorithms for recognizing a behavior of the apparatus based on the changes in the structural components of the apparatus sensed by the plurality of sensors;
a specification unit through which a user inputs a behavioral item including loading a mechanical device, unloading the mechanical device, or moving the mechanical device; and
a behavior recognition unit for selecting a behavior recognition algorithm from the plurality of behavior recognition algorithms corresponding to only the behavioral item inputted by the user, and selecting at least one of the sensor data, the operation data, and the control data corresponding to the changes in the structural components of the apparatus for use in the behavior recognition algorithm based on the behavioral item inputted by the user;

wherein, in accordance with the behavioral item inputted by the user, start and end times of the behavior are recognized by the behavior recognition unit from the at least one of the sensor data, the operation data, and the control data corresponding to the changes in the structural components of the apparatus, and the start and end times are associated with the time information accumulated in the accumulation device together with the sensor data, the operation data, and the control data obtained from the apparatus; and a display device configured to display the at least one of the sensor data, the operation data, and the control data obtained from the apparatus and content of only the behavior recognized by the behavior recognition unit together with the time information;

wherein the at least one of the sensor data, the operation data, and the control data obtained from the apparatus and content of the recognized behavior in a section in which a specific behavior is performed are extracted together with the time information and are arranged and displayed in a three-dimensional space, in which an x-axis indicates an elapsed time from the start time of the behavior, a y-axis indicates a sensor value, and a z-axis indicates a time at which the sensor value is measured.

2. The analysis device for time series data according to claim 1, wherein the at least one of the sensor data, the operation data, and the control data and content of the behavior are output.

3. The analysis device for time series data according to claim 1, wherein the at least one of the sensor data, the operation data, and the control data obtained from the apparatus, content of the recognized behavior, and the time information in a section in which a specific behavior is performed are extracted and output.

4. The analysis device for time series data according to claim 1, wherein a diagnosis algorithm is changed in each behavior section by using the behavior recognition algorithm corresponding to the behavior recognition item and diagnosis processing is performed.

5. An analysis method for time series data of an apparatus to be diagnosed, comprising:

receiving sensor data, operation data, and control data from a plurality of sensors arranged in the apparatus to sense changes in structural components of the apparatus during use of the apparatus;

accumulating the sensor data corresponding to the changes in the structural components of the apparatus, the operation data corresponding to the changes in the structural components of the apparatus, and the control data corresponding to the changes in the structural components of the apparatus obtained from the apparatus together with time information;

accumulating a plurality of behavior recognition algorithms for recognizing a behavior of the apparatus based on the changes in the structural components of the apparatus sensed by the plurality of sensors;

receiving an input from a user including a behavioral item of loading a mechanical device, unloading the mechanical device, or moving the mechanical device;

selecting a behavior recognition algorithm from the plurality of behavior recognition algorithms corresponding to only the behavioral item inputted by the user, and selecting at least one of the sensor data, the operation data, and the control data corresponding to the changes in the structural components of the apparatus for use in the behavior recognition algorithm based on the behavioral item inputted by the user;

recognizing start and end times of the behavior from the at least one of the sensor data, the operation data, and the control data corresponding to the changes in the structural components of the apparatus;

associating the start and end times with the time information together with the sensor data, the operation data, and the control data obtained from the apparatus; and displaying the at least one of the sensor data, the operation data, and the control data obtained from the apparatus and content of only the behavior recognized by the behavior recognition unit together with the time information;

wherein the at least one of the sensor data, the operation data, and the control data obtained from the apparatus and content of the recognized behavior in a section in which a specific behavior is performed are extracted together with the time information and are arranged and displayed in a three-dimensional space, in which an x-axis indicates an elapsed time from the start time of the behavior, a y-axis indicates a sensor value, and a z-axis indicates a time at which the sensor value is measured.

6. The analysis method for time series data according to claim 5, wherein the at least one of the sensor data, the operation data, and the control data and content of the behavior are output.

7. The analysis method for time series data according to claim 5, wherein the at least one of the sensor data, the operation data, and the control data obtained from the apparatus, content of the recognized behavior, and the time information in a section in which a specific behavior is performed are extracted and output.

8. The analysis method for time series data according to claim 5, wherein a diagnosis algorithm is changed in each behavior section by using the behavior recognition algorithm corresponding to the behavior recognition item and diagnosis processing is performed.

* * * * *